United States Patent [19]

Boyd

[11] Patent Number: 5,644,378
[45] Date of Patent: Jul. 1, 1997

[54] PROCESS FOR INITIALIZINS FRAME COUNT

[75] Inventor: James David Boyd, Rochester, N.Y.

[73] Assignee: Eastman Kodak Company, Rochester, N.Y.

[21] Appl. No.: 686,294

[22] Filed: Jul. 25, 1996

Related U.S. Application Data

[63] Continuation-in-part of Ser. No. 327,536, Oct. 21, 1994, abandoned.

[51] Int. Cl.$^6$ .............................. G03B 17/36; G03B 1/00
[52] U.S. Cl. ............................................................ 396/284

[56] References Cited

U.S. PATENT DOCUMENTS

| | | | |
|---|---|---|---|
| 3,892,354 | 7/1975 | Nagao et al. | 235/91 |
| 4,707,096 | 11/1987 | Lawther | 354/215 |
| 4,755,841 | 7/1988 | Barclay | 354/217 |
| 4,755,842 | 7/1988 | Barclay et al. . | |
| 4,839,678 | 6/1989 | Zawodny et al. . | |
| 5,235,366 | 8/1993 | Kucmerowski | 354/21.2 |

FOREIGN PATENT DOCUMENTS

| | | | |
|---|---|---|---|
| 3538012A1 | 4/1987 | Germany | B41J 1/30 |
| 2077447 | 5/1980 | United Kingdom | G03B 17/36 |

*Primary Examiner*—Safet Metjahic
*Assistant Examiner*—Daniel Chapik
*Attorney, Agent, or Firm*—Peter J. Bilinski; Robert Luke Walker

[57] ABSTRACT

A method and associated apparatus for initializing a rotatable frame counter in a camera to a preliminary setting from a random setting, in which an engagement element is placed directly on a surface of the frame counter in a ready position to engage and thereby arrest the frame counter when the frame counter is rotated from the random setting to the preliminary setting. According to the present invention, the frame counter is rotated relative to the engagement element to bring an off-axis hole on the frame counter into contact with the engagement element only when the frame counter is at the preliminary setting, whereby the engagement element will arrest the frame counter at the preliminary setting.

12 Claims, 6 Drawing Sheets

PROCESS FOR INITIALIZINS FRAME COUNT

This is a Continuation-In-Part of application Ser. No. 08/327,536, now abandoned filed 21 Oct. 1994.

FIELD OF THE INVENTION

The invention relates generally to the field of photography, and in particular to an improved method and apparatus for initializing a rotatable frame counter in a camera to a preliminary setting so that the remaining parts of the camera can be conveniently assembled in order to insure reliable operation of the camera.

BACKGROUND OF THE INVENTION

It is commonly known that photographic cameras include a rotatable frame or exposure counter which is attached to and supported by the camera body. The frame counter is interconnected to the film advancing mechanism of the camera in a manner so that the counter iteratively moves in response to the frame by frame movement of a loaded filmstrip. The counter includes a set of numerals, or other indicia, a portion of which are made visible so as to notify the user as to the number of frames which have been exposed, or the number of frames yet to be exposed.

In the assembly of such cameras, it is essential to rotatably locate the frame counter at a preliminary or initial setting prior to the assembly of the remaining components of the camera; that is, the film cartridge, the take-up spool and the rear cover. If the frame counter is not specifically located there is no assurance that a correct frame count will be presented to the user after final assembly of the camera, producing confusion and dissatisfaction.

U.S. Pat. No. 4,755,842 discloses the use of a visible marking, such as an arrow, added along with the other frame-indicating indicia on the frame counter. This assists in the camera assembly, but because of the relative sizes of the parts involved, there is a reasonable probability that the counter will not be correctly set to the specific preliminary setting. Similarly, it is also probable for eye strain and associated fatigue to develop, particularly in the mass production of such cameras.

SUMMARY OF THE INVENTION

The present invention is directed to overcoming one or more of the problems set forth above. Briefly summarized, and according to one aspect of the present invention, there is provided a method for initializing a rotatable frame counter in a camera to a preliminary setting from a random setting, comprising the steps of:

placing an engagement element directly on a surface of the frame counter in a ready position to engage and thereby arrest the frame counter when the frame counter is rotated from the random setting to the preliminary setting; and rotating the frame counter relative to the engagement element to bring engageable means located on the frame counter into contact with the engagement element only when the frame counter is at the preliminary setting, whereby the engagement element will arrest the frame counter at the preliminary setting.

According to another aspect of the present invention, there is provided an apparatus for initializing a rotatable frame counter at a preliminary setting from a random setting is characterized by:

a pin member which when in contact with a surface of the frame counter when the frame counter is biased to arrest the frame counter by engaging an off axis hole in the frame counter when the frame counter is rotated from the random setting to the preliminary setting.

According to yet another aspect of the present invention, there is provided a camera having a frame counter which is supported for rotation in a camera body from a random setting to a preliminary setting, characterized in that:

said frame counter has an off-axis hole located for engagement when the frame counter is rotated from the random setting to the preliminary setting to enable the frame counter to be arrested at the preliminary setting.

According to still another aspect of the present invention, there is provided a combination of a camera having a frame counter which is supported for rotation in a camera body and an apparatus for initializing the frame counter at a preliminary setting from a random setting, characterized in that:

said frame counter has an off-axis hole located for engagement by said apparatus when the frame counter is rotated from the random setting to the preliminary setting, said apparatus having a pin member which when in contact with a surface of the frame counter is biased to arrest the frame counter by engaging the off-axis hole in the frame counter when the frame counter is rotated from the random setting to the preliminary setting.

An advantageous aspect of the present invention is that the frame counter can be reliably oriented prior to the assembly of the remaining parts of the camera in order to provide proper registration, such as prior to prewinding the film.

A further advantageous aspect of the present invention is that an assembler does not have to strain his or her eyes in having to locate the correct preliminary setting of the frame counter. Rather, the assembler merely rotates the counter until the counter is engaged and arrested in place by an engagement member at the preliminary setting.

A further advantageous aspect of the present invention is that the herein described initializing process can be performed in either an automated or manual fashion using the described engagement element and engagement means of the described apparatus and frame counter.

These and other aspects, objects, features and advantages of the present invention will be more clearly understood and appreciated from a review of the following Detailed Description of the Preferred Embodiments and appended Claims, and by reference to the accompanying Drawings.

DETAILED DESCRIPTION OF THE INVENTION

A preferred embodiment of the present invention is herein described as pertaining to a recyclable single-use camera which is shown in FIGS. 1–6. For background purposes, in typical single-use cameras, a user exposes the film contained in the camera body and turns the entire film package; that is, the camera and the film contained therein to the photofinisher who unloads the film for development. In most cases, the filmstrip is initially prewound onto a take-up spool or into a take-up roll chamber of the camera body, so that as exposures are taken, the filmstrip is rewound into a film cartridge which is removed by the photofinisher. In cameras of this type, it is not intended for the camera per se to be reused, although some parts of the camera such as the covers, the camera body and some of the supported camera parts such as the taking lens are ground down for recycling purposes. The remaining parts are typically discarded.

In this particularly described embodiment, however, the single-use camera can be refurbished and reassembled using previously used single-use camera parts, as described in greater detail below. It should be noted and will become readily apparent, however, that the present invention can be applied other than the recyclable single-use camera of the type herein described.

Figure 1:
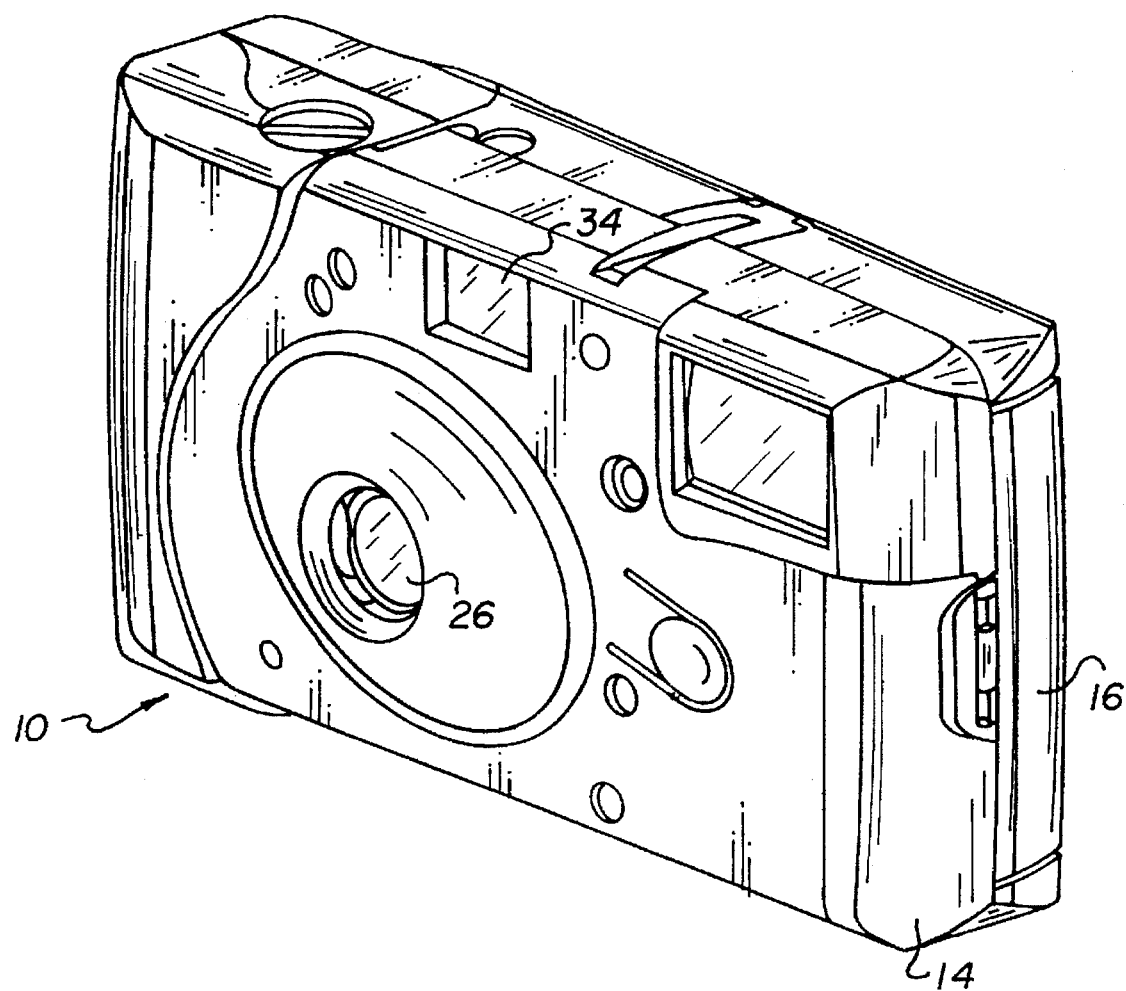
FIG. 1 is a front perspective view of a single-use camera according to a preferred embodiment of the present invention.
Figure 2:
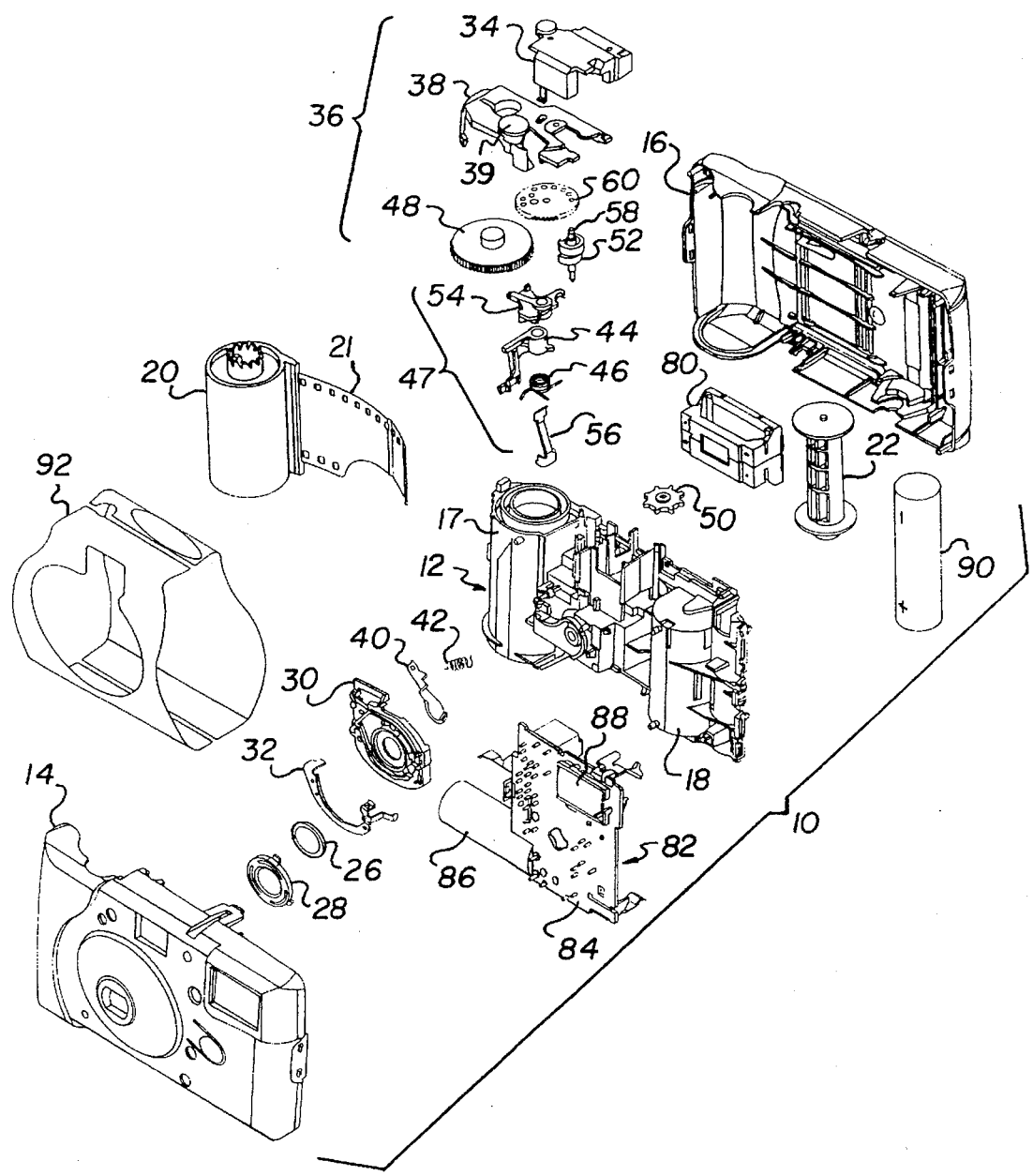
FIG. 2 is an exploded front perspective view of the camera shown in FIG. 1.

Referring first to FIGS. 1 and 2, the assembled camera 10 comprises a main body 12, a front cover 14 which is attached to the front of the main body, and a rear cover 16 attached to the rear of the main body. Each of the main body 12, the front cover 14 and the rear cover 16 are formed from molded plastic parts.

Referring now more particularly to the exploded camera detail shown in FIG. 2, the main body 12 of the camera 10 includes a pair of formed chambers 17, 18 for retaining a film cassette 20 and a take-up roll, such as a spool 22, respectively. The pair of chambers 17, 18 are oppositely disposed relative to an exposure gate 24, FIG. 4. In addition, the body 12 supports a number of camera parts which are attached thereto prior to the attachment of the covers 14, 16. Among these parts are a taking lens 26, which is attached to the front of the body 12 by means of a retainer 28 and a support plate 30 sandwiching the lens therebetween. A contact switch 32 is also attached to one side of the support plate 30. Other parts attached to the body 12 include a plastic viewfinder 34; a shutter mechanism 36 consisting of a keeper plate 38 having a depressable shutter release portion 39 for tripping a shutter blade 40, which is biased by a spring 42, via a high-energy lever 44 which is also biased, in this case by a helical spring 46; a film advancing and metering mechanism consisting of a film winding knob 48 having depending portions which engage the spool (not shown) of a loaded film cassette 20, a sprocket 50 for engaging film perforations having a spring biased portion extending into a rotatable cam 52 which engages a metering lever 54 which is biased by a spring 56, the cam 52 having an extending portion 58 for contacting the teeth of a frame counter 60; a light baffle 80 which is mounted into the rear of the body 12 and the exposure gate 24, FIG. 4; and a flash illumination assembly 82 including a circuit board 84, capacitor 86 and flashhead 88, which is powered by a battery 90. As noted above, the front cover 14 and the rear cover 16 are sandwiched together along with the body 12 to form an assembled camera 10 and a label 92 is subsequently attached to the finished camera. The main body 12, covers 14 and 16, and keeper plate 38 together form a body unit that provides structural support for other components.

Figure 3:
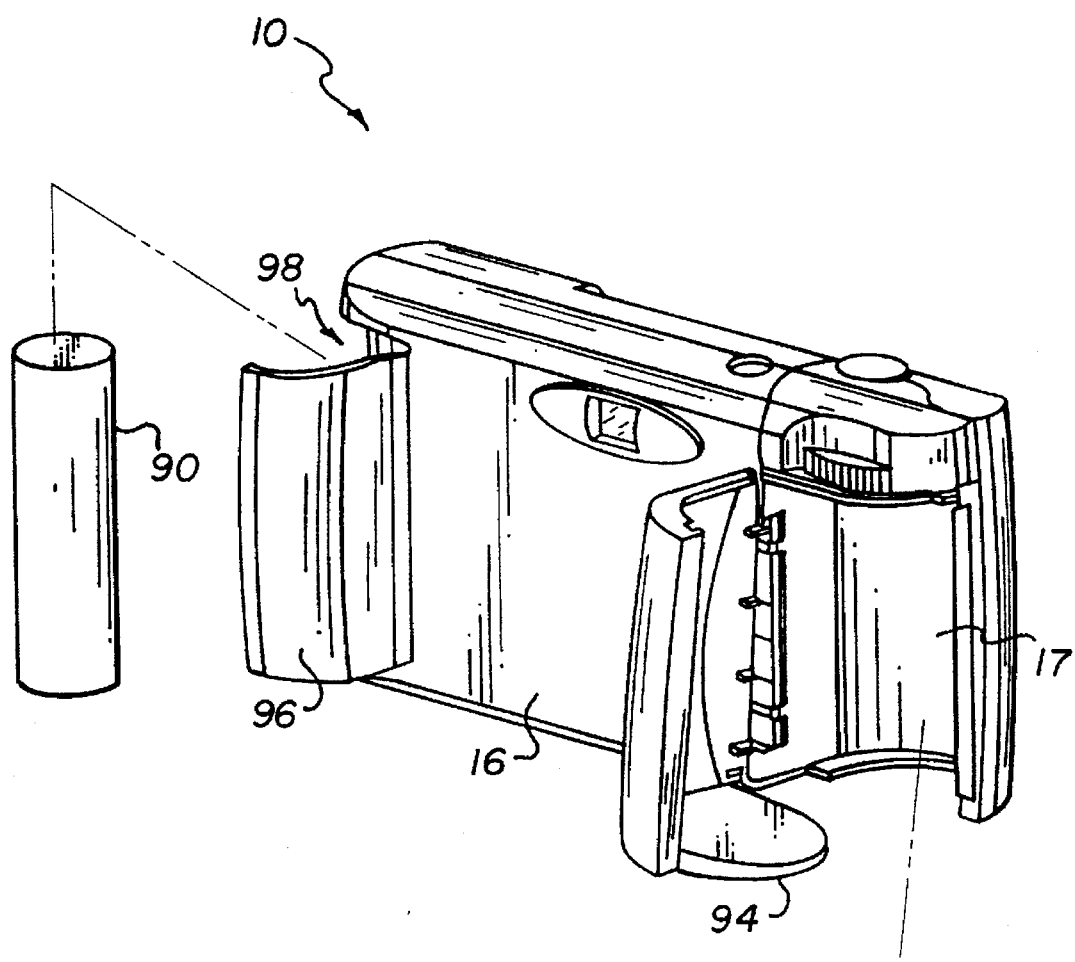
FIG. 3 is a back perspective view of the single-use camera shown in FIGS. 1 and 2 showing the removal of the film cartridge and the flash battery from the rear portion of the camera.

Referring to FIG. 3, and to aid in the reusability of the camera parts supported by the camera body 12, and the camera body 12 itself according to this preferred embodiment, after all the film has been exposed by the user and the camera 10 has been sent for processing, the photofinisher opens a breakaway door 94 provided on the rear cover 16 and removes the film cassette 20 from the film cassette chamber 17. The opening of the door 94 breaks the rear cover 16 by destroying the lighttight integrity of the camera 10, but does not expose those parts which are supported by the camera body 12, FIG. 2. Similarly, a second breakaway door 96 also provided on the rear cover 14 can be opened by the photofinisher to remove the flash battery 90 from a battery compartment 98, if desired. See FIG. 3.

Figure 4:
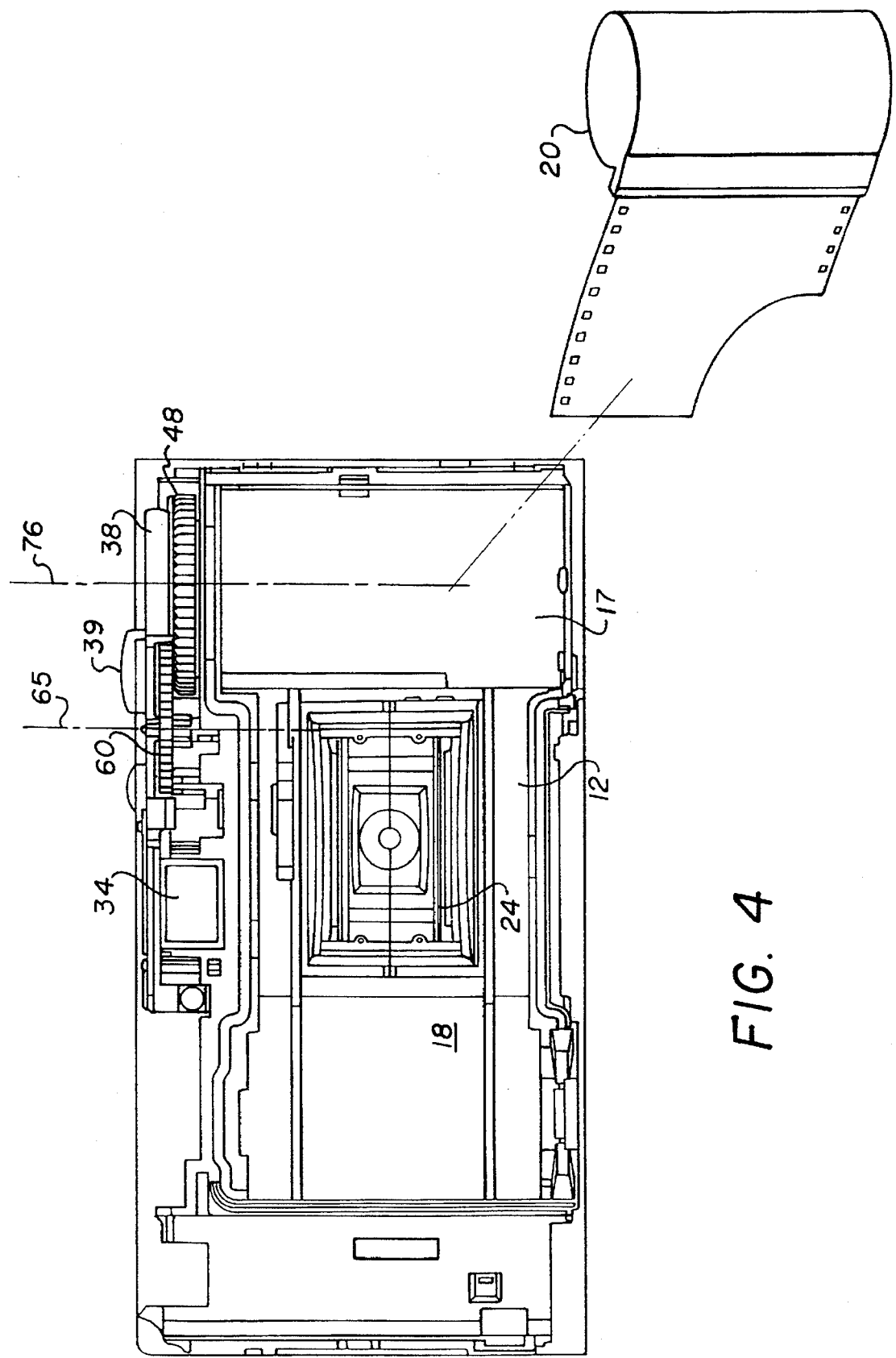
FIG. 4 is a rear sectional view of the back of the body of the camera shown in FIGS. 1-4 prior to the assembly of the rear cover.
Figure 5:
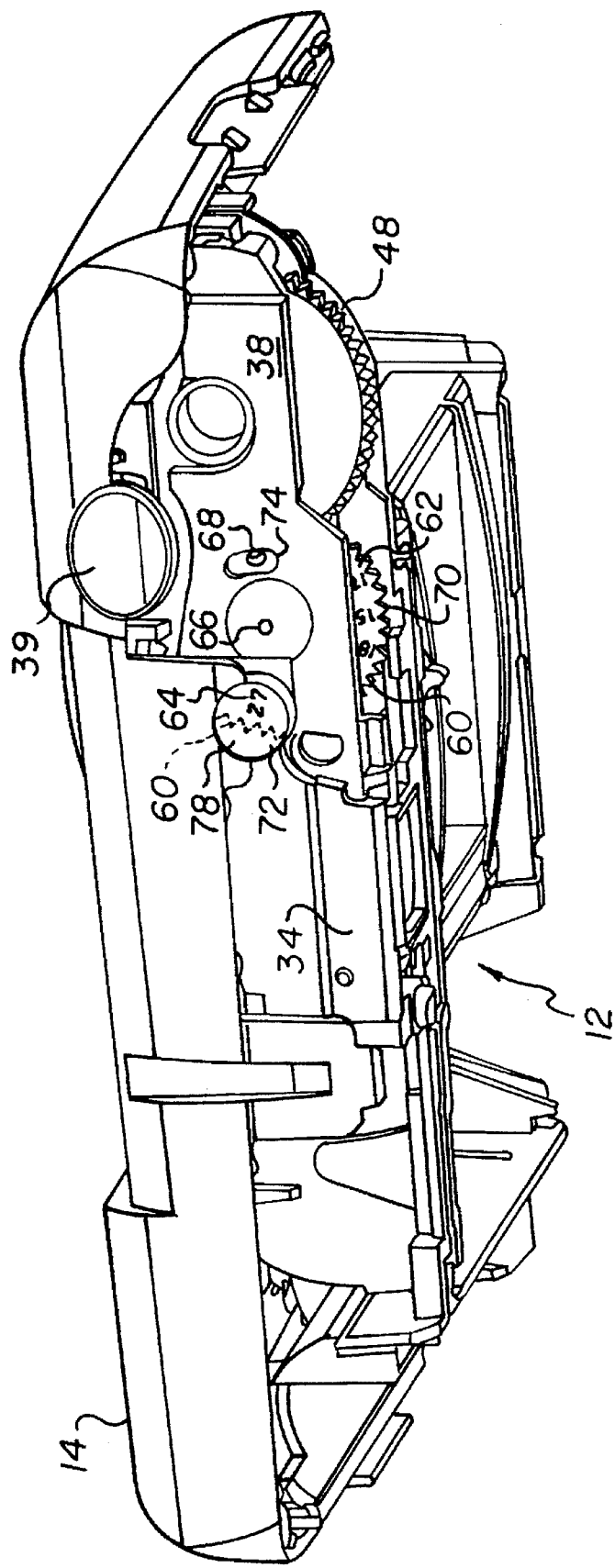
FIG. 5 is a partial top perspective view of the camera shown in FIGS. 1-3 showing an assembled frame counter set at the preliminary setting that is required for assembly.
Figure 6:
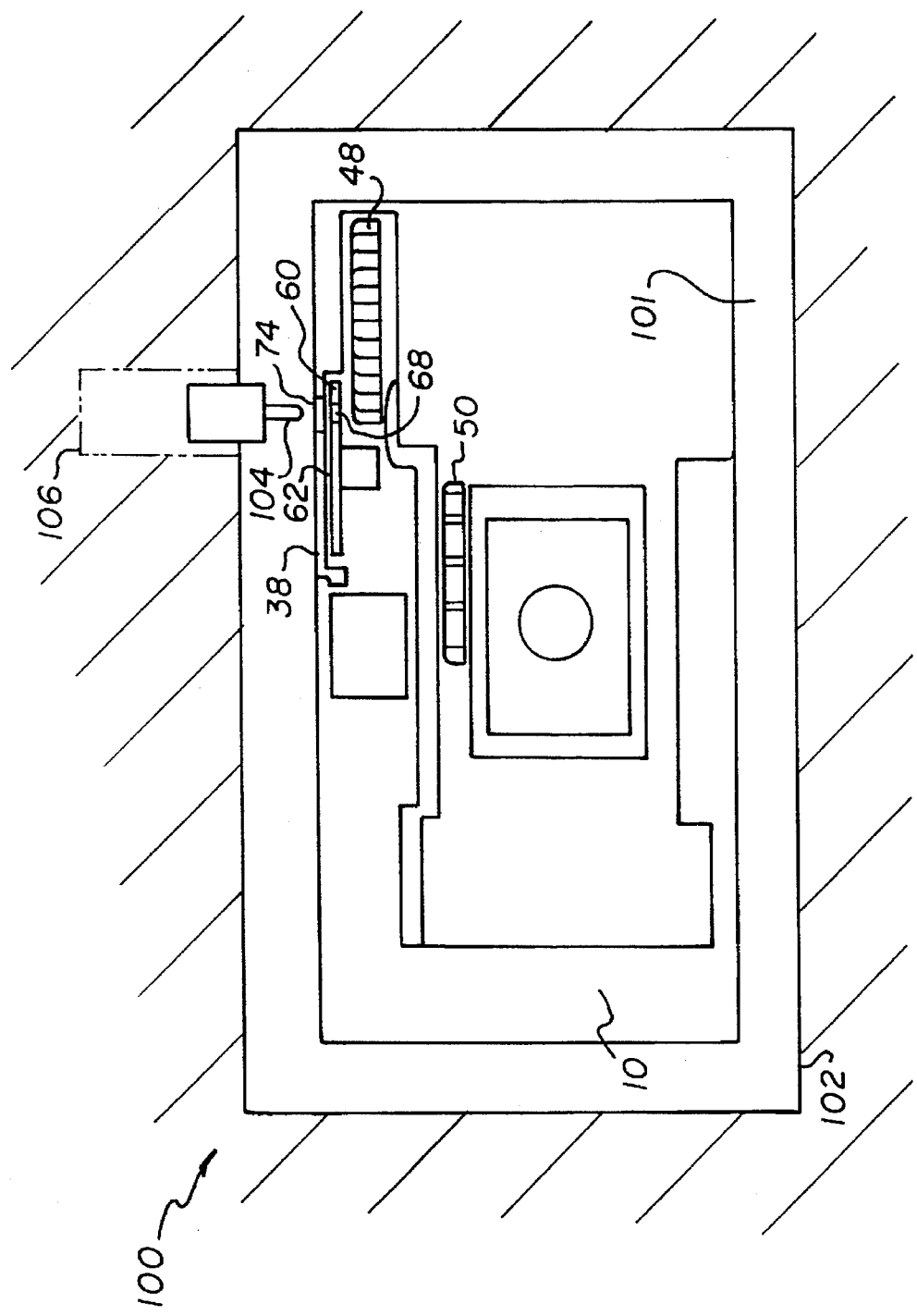
FIG. 6 is a partial rear perspective view of the camera subassembly of FIGS. 1-5, as installed in an assembly fixture used for initializing the position of the frame counter.

Referring to FIGS. 2 and 5, the frame counter 60 is preferably made from an opaque plastic and is defined by a wheel-like configuration, having a plurality of teeth 70 which are disposed about an outer periphery. A top surface 62 of the counter 60 has disposed thereon a series of sequentially and circumferentially arranged numerals 64. The numerals 64 are representative of the number of exposable frames available on the filmstrip 21 loaded into the cassette 20. In this particular embodiment, each third numeral is displayed, ie: 0, 3, 6, . . . 39, while the intermediate numerals are represented as dots. As is readily apparent, the number and denotation of the numerals 64 is easily varied depending on several factors, such as the available exposures of the loaded film cassette 20. Referring to FIGS. 4–6, the frame counter 60 is supported for rotation about a central axis 65, including a mount hole 66. Another aperture or hole 68 is also provided in an off-axis position for use with an assembly fixture 100, FIG. 6, for initializing the frame counter 60, as described in greater detail below.

Referring to FIG. 5, the previously described keeper plate 38 is mounted directly above the frame counter 60, the plate having a notched portion 72 which covers an exterior portion of the frame counter and an accessway or slot 74 which covers the engagement aperture 68 when the plate is assembled to the camera 10. The film winding knob 48 is also rotatably supported on the top portion of the body 12 about an axis 76, FIG. 6 and is positioned adjacent the frame counter 60. The keeper plate 38 is preferably made from a resilient material, and includes an integral and depressable shutter release button 39 for causing activation of the shutter mechanism 36, FIG. 2.

The plastic viewfinder 34 is also attached to the top portion of the camera body 12, adjacent the keeper plate 38 and includes a window 78 which, when assembled to the camera body 12, covers the notched portion 72 of the keeper plate. Preferably, the window 78 contains a magnifying optic to allow a portion of the numerals 64 of the counter 60 to be easily identifiable. The film winding knob 48 and the frame counter 60 are each supported by the keeper plate 38. The keeper plate 38 is configured so as to engage the camera body 12 to hold both the film winding knob 48 and frame counter 60 in place, while yet allowing each to rotate about their respective axes 65, 76, FIG. 6.

After the film cassette 20 and the flash battery 90 have been removed by the photofinisher, the single-use camera of the present embodiment is then ready to be turned over to the manufacturer for recycling. Referring to FIGS. 1–4, the front cover 14 and the rear cover 16 are each broken away from the camera body 12, each cover having releasable snap hooks (not shown) or other attachment means for allowing removal of the covers from the body 12 and from each other.

The covers, 14, 16, each being made from a recyclable plastic, such as polystyrene, can then be sent to be pulverized. In the meantime, an evaluation can be made as to whether the body 12 and each of the parts supported by the camera body 12; ie: the viewfinder 24, shutter mechanism 36, flash illumination assembly 82, etc. can be reused. Those parts which are deemed worn or damaged can be removed from the body 12 and replaced. Those remaining single-use parts, such as the frame counter 60, can remain supported by the body 12, for reassembly of the camera 10.

A new front cover 14 is then fitted to and attached to the front face of the body 12 in a manner conventionally known. At this stage of the assembly operation, the frame counter 60 should be initialized prior to the loading of an unexposed roll of film 21 into the film cassette chamber 17.

INITIALIZATION OF FRAME COUNTER

Turning now to FIGS. 2–6, after the supported components have been added to the main body 12, and the front cover 14 has been attached to the front of the body, the camera 10 can be placed in an assembly fixture 100, having a cavity 101 and a base 102 for supporting the camera 10 which is preferably installed so that the rear of the camera body 12 is presented outward of the cavity, as shown.

A pin member 104, or other engagement element, which is biased by a compression spring or biasing member 106 is retracted by known means from a first or nominal position as the camera 10 is placed within the cavity 101. The pin member 104, however, remains in direct contact with the top of the camera 10, and specifically with the top surface 62 of the frame counter 60 through the slot 74 in the keeper plate 38 in a ready position. The frame counter 60 is accessible from outside the main body 12. The frame counter 60 is rotated in either a clockwise or counterclockwise direction from the random setting which the frame counter 60 is first attached to the camera body 12 until the contacting pin member 104 engages the off-axis hole 68, which is sized to receive the pin member. The frame counter 60 can be rotated manually by an operator or by an automated device such as drive wheel rotated by a stepper motor. The movement of the pin member 104 into the off-axis hole 68 arrests or locks the frame counter 60 from further rotational movement and further positions the counter 60 in an initial or preliminary setting.

After the frame counter 60 has been initialized, the remaining components of the camera 10 can now be assembled. According to this particular embodiment, the pin member 104 is then retracted from the off-axis aperture 68, allowing the camera 10 to be removed from the assembly fixture 100 after the sprocket 50 has preferably first been rotated in a counterclockwise direction by one frame position; that is, by a single rotation of the sprocket wheel 50 in order to perform a metering check of the camera 10. As noted in the preceding discussion above, after the frame counter 60 has been initialized by the engagement of the pin member 104 with the off-axis aperture 68, an unexposed film cartridge 20 can be placed in the film cassette chamber 17 in the rear of the camera body 12, and a take up spool 22 can be placed in the film take-up chamber 18.

A leading portion of the film 21 contained within the film cassette 20 is engaged with the take-up spool 22 housed within the film roll chamber 18, as is conventionally known. A new rear cover 16 is then snapped or otherwise attached at a preliminary assembly position onto the rear of the camera body 12 in a manner conventionally known.

The camera 10 can then be placed on a conveyor (not shown) and be moved to a separate assembly station at which the rear cover 16 is permanently assembled to the remainder of the camera 10. Once the rear cover 16 is attached to the camera body 12, the film 21 can preferably, as in the present embodiment, be prewound onto the take-up spool 22 via insertion of a torque wrench into an external opening (not shown) provided on the camera body 12, allowing access to the end of the take-up spool 22. As the film 21 is prewound, the frame counter 60 iteratively rotates from its preliminary setting in a clockwise fashion as the film 21 is taken up by the take-up spool 22, in a manner not unlike the actual operation of the camera 10, which is described below.

The iterative advancement of the frame counter 60 occurs through the clockwise rotation of the sprocket wheel 50, which is caused to move in response to a clockwise movement of the film take-up spool 22, as the film 21 is prewound onto the spool. A single revolution of the sprocket 50 causes the extending portion 58 of the cam 52 to increment the frame counter 60 by a single frame indicating indicia. The prewinding process of the film 21 iteratively rotates the frame counter 60 by the number of film frames available, so that the maximum number of film frames in this case, 39, is made visible in the window 78 to the user.

OPERATION OF THE CAMERA

Upon assembly, the camera 10 operates in a normal fashion as follows. Each exposure frame of the filmstrip 21 is sequentially advanced by the film winding knob 48, which is rotated in a counterclockwise direction, causing the spool within the cassette (not shown) to rotate in a counterclockwise direction, as well as the sprocket wheel 50, due to the engagement of the film perforations therewith, in a counterclockwise direction. The sprocket wheel 50 also causes the connected cam 52 to similarly rotate in a counterclockwise direction. Engaging surfaces on the cam 52 cock the high energy lever 44 against the force of the spring 42 as the cam is rotated so as to release the lever in order to trip the shutter blade 40 after depression of the shutter release portion 39 of the keeper plate 38. At the same time, the extending portion 58 of the cam 52 engages one of the teeth 70 of the frame counter 60, causing the counter to rotate by the movement of a single peripheral tooth 70, also sequentially changing the numeral 64 viewed in the window 78. This particular advancement feature is described in greater detail in commonly assigned U.S. Pat. No. 4,755,842, issued Jul. 5, 1988 to David Barclay and Lee D. Oldfield which is hereby incorporated by reference. As described by the incorporated reference, each succeeding film exposure allows the sequential advance of the frame counter 60 in response to the frame by frame advancement of the filmstrip 21 until the counter 60 indicates there are zero frames remaining. At this stage, the camera 10 is sent to the photofinisher for film removal, processing and possibly additional recycling of the camera, as previously described above.

The invention has been described with reference to a preferred embodiment. However, it will be appreciated that variations and modifications can be effected by a person of ordinary skill in the art without departing from the scope of the invention.

PARTS LIST for FIGS. 1–6

10 camera 12 main body 14 front cover 16 rear cover 17 film cassette chamber 18 film roll chamber
20 film cassette
21 filmstrip
22 take-up spool
24 exposure gate
26 taking lens
28 retainer
30 support plate
32 contact switch
34 viewfinder
36 shutter mechanism
38 keeper plate
39 shutter release portion
40 shutter blade
42 spring
44 high-energy lever
46 helical spring
47 film advancing and metering mechanism
48 film winding knob
50 sprocket
52 cam
54 metering lever
56 spring
58 extending portion
60 frame counter
62 top surface
64 numerals
65 axis
66 mount hole
68 off-axis hole
70 teeth
72 notched portion
74 slot
76 axis
78 window
80 light baffle
82 flash illumination assembly
84 circuit board
86 capacitor
88 flash head
90 flash battery
92 label
94 first break-away door
96 second break-away door
98 battery compartment
100 assembly fixture
101 cavity
102 base
104 pin member
106 spring

I claim:

1. A method for initializing a rotatable frame counter in a camera to a preliminary setting from a random setting, comprising the steps of:

placing an engagement element directly on a surface of the frame counter in a ready position to engage and thereby arrest the frame counter when the frame counter is rotated from the random setting to the preliminary setting; and rotating the frame counter relative to the engagement element to bring engageable means located on the frame counter into contact with the engagement element only when the frame counter is at the preliminary setting, whereby the engagement element will arrest the frame counter at the preliminary setting.

2. A combination of a camera having a frame counter which is supported for rotation in a camera body and an apparatus for initializing the frame counter at a preliminary setting from a random setting, is characterized in that:

said frame counter has an off-axis hole located for engagement by said apparatus when the frame counter is rotated from the random setting to the preliminary setting, said apparatus having a pin member which when in contact with a surface of the frame counter is biased to arrest the frame counter by engaging the off-axis hole in the frame counter when the frame counter is rotated from the random setting to the preliminary setting.

3. An apparatus for initializing a frame counter at a preliminary setting from a random setting comprising:

means for retaining a camera body having assembled thereto a frame counter supported for rotation;

an engagement member connected to said retaining means for engaging a face of the assembled frame counter wherein said engagement member engages an off-axis hole in the face of the frame counter when the frame counter is rotated from the random setting to the preliminary setting; and means for biasing said engagement member into contact with the face of the counter and into engagement with the off-axis hole when said frame counter is rotated to the preliminary setting so as to arrest said frame counter at the preliminary setting.

4. An apparatus as recited in claim 3, wherein said retaining means includes a base having a cavity sized for retaining said camera body and said engagement member is a pin sized for engaging said off-axis hole and said biasing means is a spring for biasing said pin into engagement with the face of the counter, whereby said pin when engaged with the off-axis hole arrests said frame counter from rotating and establishes the preliminary setting.

5. A camera comprising a body and a rotatable frame counter which is assembled to the body, said frame counter being mounted for rotation at a rotatable mount by said body to a preliminary angular position and including visible indicia located on the face of the counter, said camera including a window for viewing a portion of the visible indicia as the frame counter is rotated, is characterized by:

at least one off-axis hole located on the face of said counter between the rotatable mount and the outer periphery of the counter, wherein said at least one off-axis hole is not visible in the window when the counter is rotated to the preliminary angular position so as to initialize the frame counter.

6. A camera as recited in claim 5, wherein said window includes a magnifying optic.

7. A camera comprising: a frame counter and a body unit, said frame counter being rotatable relative to said body unit about an axis of rotation to a preliminary angular position, said frame counter having an outer periphery and a face including visible indicia, said face having a hole located between said axis and said outer periphery, said body unit having a window for viewing a portion of said visible indicia as said frame counter is rotated, said body unit having an accessway disposed over said counter, said hole being disposed in said accessway when said counter is in said preliminary angular position.

8. A camera as recited in claim 7, wherein said accessway is spaced apart from said window.

9. A camera as recited in claim 7, further comprising a magnifying optic disposed in said window.

10. An initializing apparatus, for use with a camera body-frame counter assembly, said frame counter being supported by said body for rotation relative to said body about an axis of rotation, said counter having a periphery at least partially accessible from outside said body, said initializing apparatus comprising:

means for retaining said body-frame counter assembly in a predetermined location;

an engagement element connected to said retaining means, said engagement element being linearly movable relative to said body-frame counter assembly in a direction substantially parallel to said axis; and means for biasing said engagement element toward said counter.

11. The initializing apparatus of claim 10 wherein said engagement element is linearly movable along a line radially offset from said axis and from said periphery.

12. The initializing apparatus of claim 10 wherein said means for retaining is further characterized as a base having a cavity sized for retaining said body.

* * * * *